(No Model.) 2 Sheets—Sheet 1.
L. W. POWELL.
CORN PLANTER.
No. 433,092. Patented July 29, 1890.
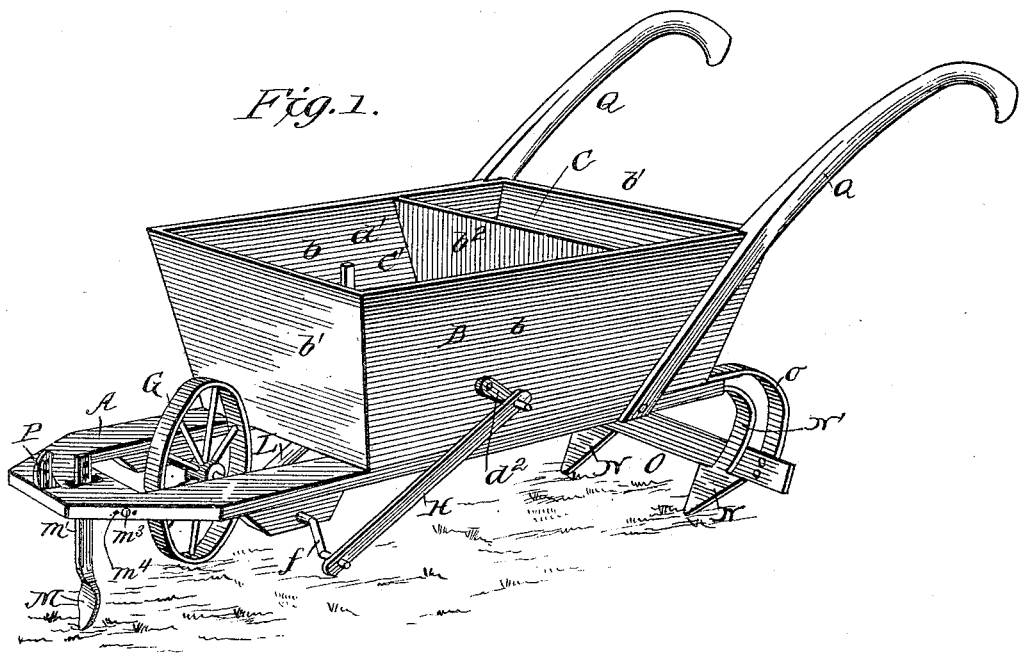
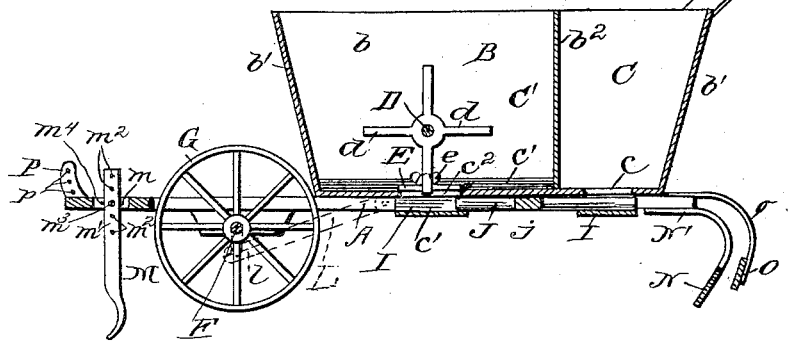
Witnesses:
Wm. J. Littell,
J. Van Allen Shields.
Louie W. Powell,
Inventor;
By his Attorney
J. R. Littell.

(No Model.)
2 Sheets—Sheet 2.
L. W. POWELL.
CORN PLANTER.
No. 433,092.  Patented July 29, 1890.
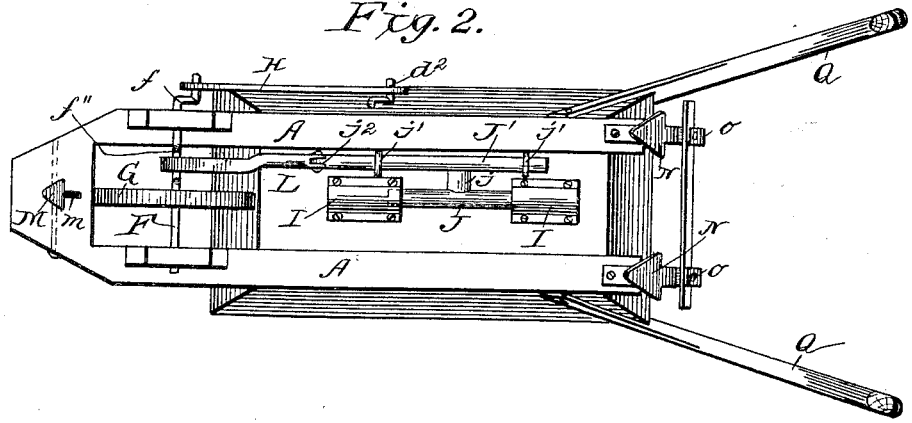
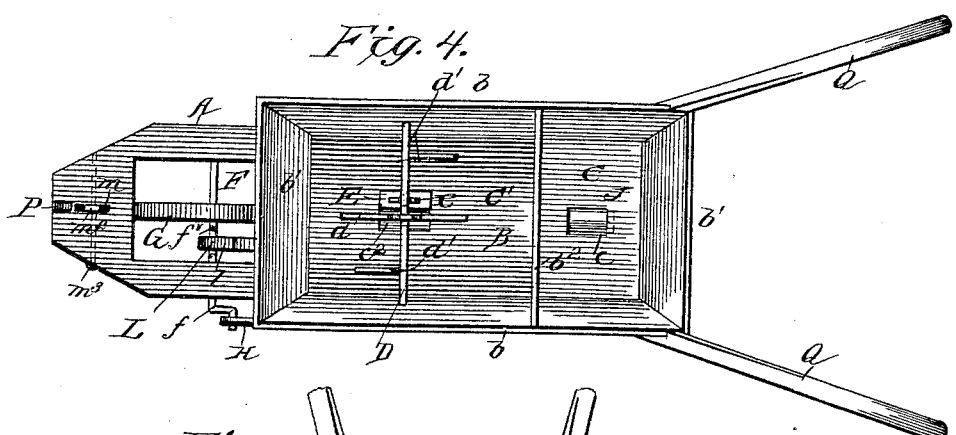
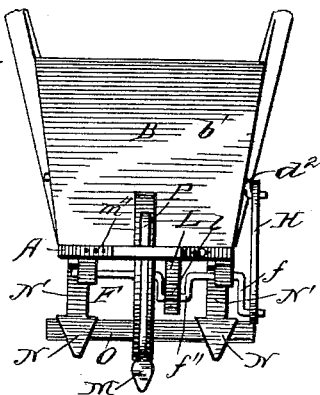
Witnesses:
Inventor:
Louis W. Powell
By his Attorney

UNITED STATES PATENT OFFICE.

LOUIE WILLARD POWELL, OF MARION, LOUISIANA.

CORN-PLANTER.

SPECIFICATION forming part of Letters Patent No. 433,092, dated July 29, 1890.

Application filed January 2, 1890. Serial No. 335,665. (No model.)

*To all whom it may concern:*

Be it known that I, LOUIE WILLARD POWELL, a citizen of the United States, residing at Marion, in the parish of Union and State of Louisiana, have invented certain new and useful Improvements in Corn-Planters, of which the following is a specification.

This invention relates to corn-planters; and it has for its object to provide in combination therewith a manure-distributer, whereby the machine is adapted to perform a double function with one operation.

A further object of the invention is to render certain mechanism detachable to adapt the machine for planting cotton.

A further object of the invention is to provide a simple and efficient machine of this character possessing advantages in point of inexpensiveness and durability.

In the drawings, Figure 1 is a perspective view of my improved planter. Fig. 2 is a bottom or inverted plan view. Fig. 3 is a vertical longitudinal sectional view. Fig. 4 is a top or plan view. Fig. 5 is an end elevation. Corresponding parts in the figures are denoted by the same letters of reference.

Referring to the drawings, A designates a frame, upon which is mounted a hopper B, comprising upwardly-flaring sides and ends $b\ b'$, respectively. The hopper is divided into two compartments C C' by a vertical partition $b^2$, located at about one-third the length of the hopper from the rear end thereof. The rear or corn compartment C has a feed-opening in its bottom, as shown at $c$, and the front or manure compartment C' is provided with a concave bottom $c'$, having a longitudinal feed-slot $c^2$. Within the latter compartment is journaled a transverse rotatable shaft D, provided with a central series of radiating feed-fingers $d$, adapted during the rotation of the shaft to project through the feed-slot and force the manure therethrough. At each side of said feed-fingers and projecting transversely from the shaft is an agitating-finger $d'$, the latter being oppositely disposed. The feed of the manure is regulated by a slide E, adapted to be adjusted over the feed-slot $c^2$, and is retained in position by a thumb-screw $e$.

Between the longitudinal side beams of the frame in front of the hopper is journaled a transverse shaft F, carrying a drive-wheel G. The shaft F is provided at one end with a crank-arm $f$, which is connected with a crank-arm $d^2$, provided at the corresponding end of the shaft D by a pitman H, by means of which the latter shaft is rotated when the planter is operated.

The corn and manure are received as they fall through the respective feed-openings by longitudinally-disposed troughs or approximately semi-cylindrical plates I, secured upon the under side of the planter and directly under said feed-openings. These troughs or plates form the bearings for the ends of a reciprocating bar or rod J, rigidly connected near its center with a parallel bar or rod J' by a cross-piece $j$. The bar or rod J' bears in staples $j'\ j'$, secured to the under side of the planter, and is provided with an elongated front end $j^2$. The latter is pivotally connected with one end of a pitman L, which is provided at its other end with a detachable bearing $l$, connected with a crank-arm $f''$, formed on the shaft F adjacent to the wheel G. Thus as the shaft F is rotated the bar or rod J, through its connections, is reciprocated. The office of the bar or rod J will be obvious. Assuming that the front end of the latter is in a position in rear of the manure-feed slot, and the planter in operation, the manure is forced, as before described, through the feed-slot and into the trough disposed thereunder, and as the bar or rod is moved forward it forces the manure held by the trough out of the same and drops it upon the ground. During the forward movement of the rod or bar the corn-feed opening is cleared of the latter and the corn permitted to fall in the trough located under the said feed-opening, which, by the return movement of the bar or rod, is shoved out upon the ground at a point where the manure has previously been distributed, the movement of the planter during this double operation corresponding to the length of space between the manure and corn feed openings.

At the front end of the frame is provided a centrally-located vertical slot $m$, within which is disposed the standard $m'$ of an opener-plow M. The plow-standard is provided with a vertical series of perforations $m^2$, one of which is engaged by a bolt $m^3$, the latter being also passed through coincident perforations $m^4 m^4$ in the frame. Coverer-plows N N are also provided at the rear end of the planter, the standards for which are formed by the rear curved contracted ends N' N' of plates N'' N'', secured longitudinally upon the bottom of the frame at the side edges thereof.

O designates a transversely-disposed scraper located in rear of the coverer-plows, and is designed to level the surface of the ground after the operation of the planter and distributer. This scraper is bolted to the lower ends of two curved standards $o\ o$, the upper ends of the latter being secured to the frame.

A clevis P projects upwardly from the front end of the frame, and is provided with a vertical series of perforations $p$ for regulating the draft. Handle-bars Q Q are also provided at the rear end of the planter, secured at their lower ends to the sides of the hopper.

The operation and advantages of my invention will be readily understood by those skilled in the art to which it appertains. It will be obvious that a planter constructed in accordance with my invention will effectually serve the double purpose of planting the seed and distributing the manure at one and the same operation.

It will be further obvious that by disconnecting the reciprocating mechanism through the medium of the detachable bearing $l$ the manure-box can be readily adapted for planting cotton-seed.

I claim as my invention—

1. The combination, with a planter provided with a two-part hopper respectively adapted for manure and seed and having feed-openings in the bottom thereof, of troughs disposed longitudinally under the feed-openings and in the same longitudinal plane, said troughs being adapted to receive the manure and seed, and a reciprocating bar or rod sliding in both of said troughs and adapted to alternately eject the manure and seed therefrom, substantially as set forth.

2. The combination, with a planter provided with a two-part hopper respectively adapted for manure and seed and having feed-openings and troughs disposed longitudinally under the latter and in the same longitudinal plane, said troughs being open at both ends and adapted to receive the manure and seed, of a reciprocating bar or rod sliding in both of said troughs and adapted to alternately eject the manure and seed therefrom, a bar or rod rigidly connected with said reciprocating bar, and a pitman connecting the former with a crank-arm on the drive-shaft, substantially as set forth.

3. The herein-described combined planter and manure-distributer, comprising the frame carrying a two-part hopper respectively adapted for manure and seed and having feed-openings, receiving-troughs disposed longitudinally under the latter and in the same longitudinal plane, a reciprocating bar or rod sliding in both of said troughs and adapted to alternately eject manure and seed therefrom, a rotatable shaft journaled in the manure-compartment and carrying feed and agitating fingers, opener and coverer plows, a scraper in rear of the latter, a clevis, and handle-bars, all arranged and adapted to operate substantially as and for the purpose set forth.

In testimony whereof I affix my signature in presence of two witnesses.

LOUIE WILLARD POWELL.

Witnesses:
WM. WRIGHT HEARD,
JAMES CRUITT MONTGOMERY.